United States Patent
Cyr et al.

[11] Patent Number: 6,138,913
[45] Date of Patent: Oct. 31, 2000

[54] SECURITY DOCUMENT AND METHOD USING INVISIBLE CODED MARKINGS

[75] Inventors: Michael John Cyr; James John Krutak, Sr.; Horst Clauberg; Tony Wayne Helton, all of Kingsport, Tenn.

[73] Assignee: Isotag Technology, Inc., Houston, Tex.

[21] Appl. No.: 08/981,859

[22] PCT Filed: Nov. 5, 1997

[86] PCT No.: PCT/US97/20342

§ 371 Date: Jan. 5, 1998

§ 102(e) Date: Jan. 5, 1998

[87] PCT Pub. No.: WO98/22291

PCT Pub. Date: May 28, 1998

[51] Int. Cl.$^7$ .................................................. G06K 7/10
[52] U.S. Cl. .................................. 235/468; 235/491
[58] Field of Search .................................. 235/468, 457, 235/462.01, 462.49, 469, 472.03, 491

[56] References Cited

U.S. PATENT DOCUMENTS

| | | | |
|---|---|---|---|
| Re. 27,117 | 4/1971 | Byrne et al. | 260/314.5 |
| Re. 34,480 | 12/1993 | Eda | 540/139 |
| 3,614,430 | 10/1971 | Berler | 250/71 R |
| 3,630,941 | 12/1971 | Bergmark et al. | 252/186 |
| 3,734,874 | 5/1973 | Kibler et al. | 260/29.2 E |
| 3,763,356 | 10/1973 | Berler | 235/468 X |
| 3,779,993 | 12/1973 | Kibler et al. | 260/75 S |
| 3,828,010 | 8/1974 | Davis et al. | 260/75 N |
| 3,933,094 | 1/1976 | Murphy et al. | 101/426 |
| 4,180,204 | 12/1979 | Koenig et al. | 235/385 |
| 4,202,491 | 5/1980 | Suzuki | 235/491 |
| 4,233,196 | 11/1980 | Sublett | 260/29.2 N |
| 4,239,261 | 12/1980 | Richardson | 283/21 |
| 4,250,078 | 2/1981 | McFarlane et al. | 260/40 R |
| 4,321,133 | 3/1982 | DiGiacomo | 209/3.3 |
| 4,335,220 | 6/1982 | Coney | 523/414 |
| 4,408,004 | 10/1983 | Pengilly | 524/398 |
| 4,420,581 | 12/1983 | McFarlane et al. | 524/431 |
| 4,423,814 | 1/1984 | White | 209/3.3 |
| 4,435,220 | 3/1984 | Watanabe et al. | 106/291 |

(List continued on next page.)

FOREIGN PATENT DOCUMENTS

| | | |
|---|---|---|
| 40 24 130 A 1 | 2/1992 | Germany . |
| 62-206695 | 9/1987 | Japan . |
| 3-214280 | 9/1991 | Japan . |
| 1 537 375 | 12/1978 | United Kingdom . |
| 2 237 804 | 5/1991 | United Kingdom . |

OTHER PUBLICATIONS

Wheeler, Bob L., et al., "A Silicon Phthalocyanine and Silicon Naphthalocyanine: Synthesis, Electro–chemistry, and Electrogenerated Chemiluminescence", JACS, vol. 106, pp. 7404–7410 (1984). Month missing.

Chemical Abstracts, vol. 77, p. 74, 141469m (1972). Month missing.

Chemical Abstracts, vol. 106, p. 80, 86223s (1987). Month missing.

Chemical Abstracts, vol. 114, p. 98, 230681z (1991). Month missing.

Chemical Abstracts, vol. 114, p. 744, 196444n (1991). Month missing.

Chemical Abstracts, vol. 114, p. 744, 196445p (1991). Month missing.

Chemical Abstracts, vol. 114, p. 742, 196418g (1991). Month missing.

Nassau, Kurt, "The Physics and Chemistry of Color: The Fifteen Causes of Color". Month and year missing.

*Primary Examiner*—Michael G Lee
*Attorney, Agent, or Firm*—John R Casperson; Mark L. Davis

[57] ABSTRACT

An invisible indicia or encoded information is imprinted on a substrate using a compound which produces a fluorescence at a wavelength greater than about 650 nm when exposed to near infrared radiation. The information covered by a layer of material that reflects or absorbs a substantial amount of the visible and UV radiation illuminating its surface.

23 Claims, 1 Drawing Sheet

U.S. PATENT DOCUMENTS

| | | | |
|---|---|---|---|
| 4,476,272 | 10/1984 | Pengilly | 524/398 |
| 4,504,084 | 3/1985 | Jauch | 283/94 |
| 4,535,118 | 8/1985 | Pengilly | 524/398 |
| 4,540,595 | 9/1985 | Acitelli et al. | 427/7 |
| 4,541,438 | 9/1985 | Parker et al. | 128/664 |
| 4,591,707 | 5/1986 | Stenzel et al. | 235/493 |
| 4,606,859 | 8/1986 | Duggan et al. | 540/122 |
| 4,649,064 | 3/1987 | Jones | 427/256 |
| 4,704,309 | 11/1987 | Coney et al. | 427/258 |
| 4,736,425 | 4/1988 | Jalon | 380/59 |
| 4,738,785 | 4/1988 | Langston et al. | 210/738 |
| 4,804,719 | 2/1989 | Weaver et al. | 525/420 |
| 4,816,386 | 3/1989 | Gotoh et al. | 430/495 |
| 4,824,948 | 4/1989 | Stark et al. | 540/125 |
| 4,883,714 | 11/1989 | Stockl et al. | 428/412 |
| 4,904,567 | 2/1990 | Maeda et al. | 430/270 |
| 4,910,292 | 3/1990 | Blount | 528/272 |
| 4,915,827 | 4/1990 | Rosenthal | 209/577 |
| 4,973,656 | 11/1990 | Blount | 528/272 |
| 4,975,220 | 12/1990 | Streitel et al. | 252/301.35 |
| 4,983,817 | 1/1991 | Dolash et al. | 235/462 |
| 4,992,204 | 2/1991 | Kluger et al. | 252/301.16 |
| 5,006,598 | 4/1991 | Adams et al. | 524/601 |
| 5,030,708 | 7/1991 | Krutak et al. | 528/272 |
| 5,055,500 | 10/1991 | Peters et al. | 523/319 |
| 5,064,221 | 11/1991 | Miehe et al. | 283/67 |
| 5,083,814 | 1/1992 | Guinta et al. | 283/70 |
| 5,093,147 | 3/1992 | Andrus et al. | 427/7 |
| 5,102,980 | 4/1992 | Krutak et al. | 528/272 |
| 5,110,968 | 5/1992 | Tai et al. | 556/415 |
| 5,120,610 | 6/1992 | Wegner et al. | 428/447 |
| 5,143,671 | 9/1992 | Peters et al. | 264/117 |
| 5,169,881 | 12/1992 | Peters et al. | 523/319 |
| 5,194,319 | 3/1993 | Onaka et al. | 428/224 |
| 5,201,921 | 4/1993 | Luttermann et al. | 8/506 |
| 5,214,188 | 5/1993 | Tai et al. | 558/419 |
| 5,218,042 | 6/1993 | Kuo et al. | 524/601 |
| 5,260,052 | 11/1993 | Peters et al. | 424/63 |
| 5,292,855 | 3/1994 | Krutak et al. | 528/289 |
| 5,304,789 | 4/1994 | Lob et al. | 235/487 |
| 5,331,140 | 7/1994 | Stephany | 235/462 |
| 5,336,714 | 8/1994 | Krutak et al. | 524/608 |
| 5,380,842 | 1/1995 | Itoh et al. | 540/128 |
| 5,397,819 | 3/1995 | Krutak et al. | 524/88 |
| 5,406,646 | 4/1995 | Lazzouni et al. | 106/21 R |
| 5,421,869 | 6/1995 | Gundjian et al. | 106/21 R |
| 5,423,432 | 6/1995 | Krutak et al. | 209/577 |
| 5,461,136 | 10/1995 | Krutak et al. | 528/289 |
| 5,486,274 | 1/1996 | Thetford et al. | 204/157.5 |
| 5,514,860 | 5/1996 | Berson | 235/468 |
| 5,525,516 | 6/1996 | Krutak et al. | 436/56 |
| 5,525,798 | 6/1996 | Berson et al. | 235/468 X |
| 5,542,971 | 8/1996 | Auslander et al. | 106/21 A |
| 5,553,714 | 9/1996 | Cushman et al. | 209/577 |
| 5,608,053 | 3/1997 | Thetford et al. | 540/140 |
| 5,614,008 | 3/1997 | Escano et al. | 106/23 D |
| 5,665,151 | 9/1997 | Escano et al. | 106/31.15 |
| 5,703,229 | 12/1997 | Krutak et al. | 540/140 |
| 5,760,384 | 6/1998 | Itoh et al. | 235/468 |

SECURITY DOCUMENT AND METHOD USING INVISIBLE CODED MARKINGS

BACKGROUND

The present invention relates to placing a marking on a substrate or other object which is invisible to the unaided human eye but can be detected using an apparatus producing light in the visible and near infrared spectra. The invention further relates to a method of encoding information on a substrate using a near infrared fluorescing compound and detecting the compound.

Prevention of fraud, copying, or theft of goods such as automobiles, boats, motorcycles, bicycles, art, collectibles, and important documents such as financial instruments (stocks, bonds, security papers, checks and bank notes), and government issued papers (passports, drivers licenses and identity cards) has been a long-standing problem in society. The prior art is replete with many approaches to deter or avoid such fraud, copying or theft by placing visible and/or invisible identification marks on the goods and documents. Such identification marks have been placed openly or in covert locations. For example, U.S. Pat. No. 4,239,261 issued to Richardson on Dec. 16, 1980 discloses a micromarking label applied to an article. The marker or label is formed from a thin plate of generally clear plastic material which is typically transparent or may be tinted with a specific color if required. The thickness of the material is about 0.001 of an inch to 0.002 of an inch (1 to 2 mills) with an overall dimension ranging from about 0.0286 by 0.0286 of an inch. The exact dimensions of the marker or label can be varied to fill space requirements or to eliminate optical resolution or optical definition limitations of photo reproduction equipment. The area of the marker is divided into segregated digital areas into which homogeneous or digital markings are placed in order to designate a specific code to identify the object. A disadvantage of this marker is that it resides on the surface of the substrate. The label can be covered up, knocked off or obliterated in which case the marker or label looses its effectiveness.

U.S. Pat. No. 5,083,814 issued to Guinta et al. on Jan. 28, 1992 discloses a security method for applying a security marking to an automobile, boat and the like. The method involves a nationwide network of authorized dealers which are supplied with input and output devices such as computer, monitor and a hand-held marking device. Using specified locations data supplied from a central process unit, the dealer applies to the surface of the automobile a confidential and invisible registration code.

In many printing technology applications it is necessary to distinguish an original from a copy or counterfeit item. With modem copying techniques, printed material can be reproduced at will and is virtually indistinguishable from the original, especially if the copy is printed on a substrate that is similar to the original. It is well known that various means and methods have been proposed for covertly marking and identifying items to circumvent and economically dissuade someone from copying the original. Typically, such means and methods used inks or paints that fluoresce when subjected to an ultraviolet light source. Such simple fluorescent marking used in conjunction with ultraviolet light provides a dramatic effect, since the marking, which is seemingly invisible to light in the visible spectra of 400 to 700 nanometers becomes brightly fluorescent under ultraviolet radiation. For example, U.S. Pat. No. 4,736,425 issued to Jalon on Apr. 5, 1988 discloses a two-step marking method for important documents, such as security papers, bank bills, checks, shares, stamps and the like to prevent forgery and to authenticate the document. In the first step of the marking process, one or more elements which form a chelate are deposited in or on the security paper. The elements are chosen so that the chelate is not formed until later. In the second step of the process, the chelate is formed by depositing on the paper the missing components to produce the synthesis of the chelate. The missing elements are added to the paper by means of an aqueous alcoholic deposition. Accordingly, it is possible to deposit the ligands in the first step and the metal ions in the second step, or vice-versa. The chelated compounds are formed with metals and rare-earth elements and are invisible under sunlight but are fluorescent when exposed to ultraviolet light rays.

This method is disadvantageous because in performing the first step, care must be taken to ensure that the deposited solutions are properly pH adjusted for the chelate when formed. Second, there must be a significant excess of the ligand to form the chelate.

U.S. Pat. No. 4,591,707 issued to Stenzel et al. on May 27, 1986 discloses the use of a hallmark on financial paper, such as bank notes, currency and the like. The hallmark is a coating on the exterior surface of the paper substrate applied by vacuum disposition techniques, such as evaporation or cathode sputtering, in the form of a pattern, stripes or figures.

U.S. Pat. No. 3,614,430 issued to Berler on Oct. 19, 1971 discloses a method electronically retrieving coded information imprinted on a substantially translucent substrate. The ink used to code the information fluoresces when exposed to ultraviolet light. The fluorescence is photoelectrically sensed through the translucent substrate. A reader device then interprets the coded information and may further preform a desired output relative to the coded information.

U.S. Pat. No. 3,933,094 issued to Murphy et al. on Jan. 20, 1976 discloses a substrate such as, a business reply envelope, having bar code information imprinted thereon. The bar code is printed on the substrate using a plurality of inks having a color which, in combination with the substrate, yields a Print Contrast Signal substantially less than 50 percent when measured in the wavelength range of 800 to 900 nanometers. Added to the ink is a metallic compound sufficient to increase the Print Contrast Signal of the ink and substrate to at least 50 percent.

U.S. Pat. No. 4,504,084 issued to Miehe et al. on Nov. 12, 1991 discloses a method for marking originals so that copies can be distinguished from the originals. The method includes using a ribbon having a printing medium for printing the original. The ribbon includes a substance in the form of a marking which, when used, produces an invisible distinguishable marking which is recognizable only by using a special scanner.

U.S. Pat. No. 5,514,860 issued to Berson on May 7, 1996 discloses a document having encoded or encrypted data printed on a transparent tape. The data is printed using an invisible ink. The ink becomes visible only when exposed to ultraviolet light or infra-red light, depending upon the dyes used in the ink.

U.S. Pat. No. 5,514,860 issued to Auslander et al. on Aug. 6, 1996 discloses a bar code having more information than a standard bar code by printing an upper layer and lower layer bar code. The ink used to print the lower bar code is a regular ink which absorbs in the visible range of the spectra, i.e., between 400 and 700 nanometers. The upper layer bar code is printed using an ink that is invisible to the naked eye. The invisible inks used are based on complexes of rare earth elements such as Eu, Th, Sm, Dy, Lu and various chelating agents to produce chromophore ligands that absorb in the ultraviolet and blue spectra region. The lower bar code is read by a first excitation source emitting a first wavelength and a first sensor and the upper layer bar code is read by a second excitation source emitting a second wavelength and a second sensor.

In all the systems that use fluorescence to highlight the encoded markings it is required that there be a reading system or scanner that will excite the fluorescing compounds. The fluorescing light is then reflected back to a detector, collected and translated into an electric current signal that is proportional to the light intensity and the area illuminated. The electric signal is then decoded and used in a predetermined manner. A disadvantage of these systems that use an ultraviolet fluorescing ink is that many materials and substrates, such as dyes, paints and coatings, have brighteners or other compounds that substantially interfere with the ultraviolet light absorption. Moreover, the ink or encoded markings must be placed close to the surface of the substrate. Thus, the markings are highly susceptible to being easily scratched or detected using a readily available ultraviolet scanner.

Therefore, there is a need for an invisible marking that can be placed on a substrate that can be substantially hidden from visible and ultraviolet light detection yet still provide a means for determining authenticity of the document. There is also a need for an invisible marking that can be placed on a substrate and protected from being inadvertently rubbed off, scratched or removed.

SUMMARY OF THE INVENTION

The present invention is based on the use of a compound that fluoresces when exposed to visible and near infra-red radiation having a wavelength of about 650 nm to about 1100 nm. The compounds are normally invisible to both the unaided human eye under normal lighting conditions and when exposed to ultraviolet light radiation.

The present invention overcomes the disadvantages of the prior art by providing a substrate and using a compound which fluoresces at a wavelength greater than about 650 nm to imprint indicia or encoded information thereon. The compound is protected and hidden from detection by one or more layers of a material that substantially absorbs, reflects, and/or scatters light in the visible and ultraviolet wavelength regions.

Another aspect of the invention is a method for marking encoded information on a substrate wherein the information is hidden from visual and ultraviolet detection. The method includes the steps of applying to a substrate an invisible encoded marking using a compound which fluoresces at a wavelength greater than about 680 nm and covering the compound with a layer of material that substantially absorbs, reflects, and/or scatters light in the visible and ultraviolet wavelength regions. The method can further include exposing the compound to an excitation radiation so that the compound produces a fluorescence, and detecting the fluorescence through the absorbing or reflecting layer.

Unexpectedly, it has been discovered that a compound that fluoresces at a wavelength greater than about 650 nm can be covered by a layer of material that reflects, scatters, or absorbs light in both visible and ultraviolet wavelength regions and, when exposed to an excitation radiation, will fluoresce sufficiently to be detected through the covering layer. This is surprising since the invisible inks used in the prior art were required to be positioned in proximity to the excitation radiation or required the substrate to be translucent permitting at least some visible light to pass through the substrate.

It is an object of the invention to provide an invisible security marking on a substrate using a fluorescing compound in which the marking is substantially hidden from light in the visible and ultraviolet wavelengths.

It is another object of the invention to provide a method for marking encoded information on a substrate wherein the information is substantially hidden from visual and ultraviolet detection.

These and other objects of the invention will become more fully apparent from the following detailed description of the invention in conjunction with the accompanying drawings of figures wherein:

DETAILED DESCRIPTION OF THE DRAWINGS

FIG. 3 is a plan view of another embodiment of the invention wherein coded information is printed on a separate substrate, such as a label, which is then affixed to a document such as a credit card, driver's license and the like.

DETAILED DESCRIPTION OF THE PREFERRED EMBODIMENTS

In accordance with the broad concept of the invention, a substrate, such as a sheet of paper, a security document, a metal surface, a credit card or an envelope has an invisible marking containing encoded information for security and/or authentication purposes. The invisible marking is imprinted on the substrate using an ink or other appropriate marking composition containing a fluorescing compound sensitive to radiation having a wavelength ranging from about 650 nanometers (nm) to about 1100 nm and preferably from about 680 nm to about 900 nm. The marking is capable of being detected through a separation layer that covers the marking.

Figure 1:
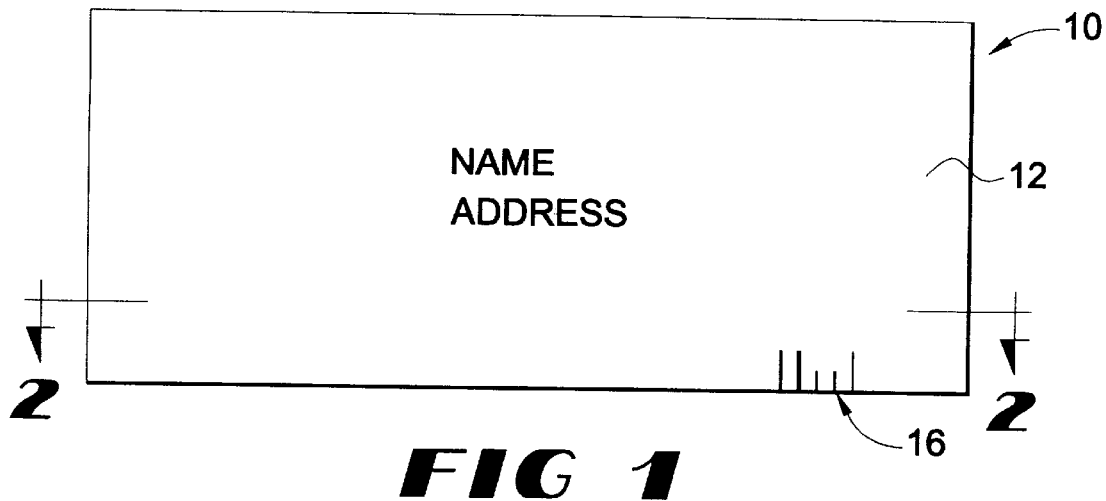
FIG. 1 is a plan view of a typical envelope having printed information thereon and having an invisible encoded marking on the inside of the envelope which shown for purposes of illustration and description of the invention.
Figure 2:
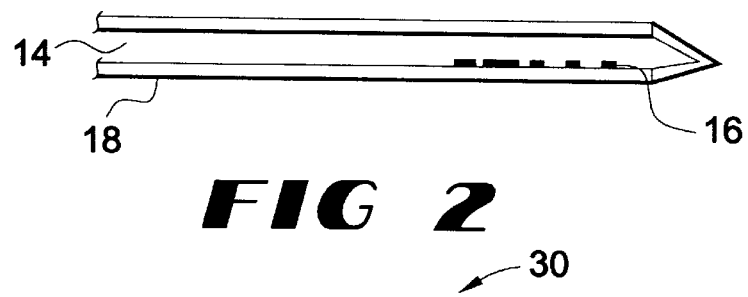
FIG. 2 is a cross-sectional view of the envelope across the plane 2—2 of FIG. 1 illustrating the invisible encoded marking positioned between two layers of light obscuring material.

Referring now to the drawings, wherein like reference characters designate like or corresponding parts throughout the views, FIGS. 1 and 2 show a substrate, illustrated as a business envelope 10, having visible printed indicia on at least one outer surface thereof. The envelope 10 generally has two planar outer surfaces, both of which may be utilized to imprint or have placed thereon information necessary for proper delivery. However, for purposes of illustration, only the front surface 12 will be shown and described. The envelope 10 also includes an inner portion 14, which is used to hold the contents of the envelope. It should be understood that when referring to physical relationships of the various described components such terms as "front," "back," "inner," "outer," "upper," "lower," "left," "right," or the like have reference solely to the orientation depicted in the drawings. Actual embodiments may differ. It is to be further understood that the invention described herein is not so limited to the particular embodiments illustrated. The front surface 12 has an area that is used for placing the recipient's name, address, city, state, zip code as well as any other pertinent information which may be used to properly identify the correct destination. The envelope 10 further includes an invisible imprinted or encoded information 16, shown as a bar code, printed on the inside 14 of the envelope 10 or on a portion of the envelope contents, not shown. In accordance with the invention, the encoded information 16 is imprinted on the envelope using an ink that is invisible under normal conditions and under visible and ultraviolet light, so as to be undetectable to the unaided human eye. The encoded information 16 is shown for illustration purposes only. The information is shown as appearing toward the lower right hand corner of the envelope 10, but can be positioned anywhere on the envelope 10 including in the area normally reserved for writing the recipient's name, address, etc.

Although, the coded information 16 is depicted as a bar code, the coded information can be a signature, symbol, and/or alpha-numeric code. Generally, a bar code is a set of black bars and white spaces lines which represent alpha/numeric information in binary form. There are several different kinds of bar codes, but in each a number, letter or other character is formed by a certain number of bars and spaces. The illustrated bar code 16 includes a horizontal series of vertically elongated bars printed in a predetermined arrangement to create the coded information. The bar code can provide a considerable amount of detailed data which may include such information as a recipient's zip code, street address, name and other information as may be necessary to properly sort and process the envelope. In accordance with the invention, the encoded information 16 appears on the inside 14 of the envelope 10 so that a portion of the envelope acts as a barrier or separation layer 18 between the excitation source and the fluorescing compound. In this manner, the bar code 16 is further protected from smearing or being inadvertently removed.

To protect the privacy as to the contents, most, if not all envelopes are made from paper which is substantially opaque to visible and ultraviolet radiation. However, depending upon the desired application, the substrate can be any suitable material which can be printed on and may include a diverse range of natural materials, synthetic materials or combinations thereof. For example, the substrate can be constructed from paper, cardboard, fabrics (woven and nonwoven), textiles, plastic films and molded plastic articles, or in the case of an automotive or an industrial application, various metal sheets and metallic foils, such as Fe, Al, Ni, Cu, various metallic alloys, glass and combinations of the above. Referring again to an envelope 10, the paper may be bond paper, pad paper, yellow paper, tracing paper, carbonless copy paper or any other paper of suitable thickness and printing qualities. A plastic substrate may be any variety of polymer materials such as nylon, polyester, polyolefins such as polyethylene, polypropylene, polystyrene and the like.

The paper substrate used can contain optical brighteners which produce a blue-colored fluorescence when exposed to ultraviolet light. Alternatively, the envelope 10 may contain a coating or colorant that either reflects or absorbs light in the visible and ultraviolet wavelengths. For example, pearlesent pigments such as IRIODIN can be placed on the surface of the envelope to impart a color to the envelope yet maintain transparency or permeability to infrared radiation. This does not impair either the deposition or encoding of the information or the subsequent detection of the data markings. The substrate is substantially opaque to visible and ultraviolet radiation and desirably blocks greater than 50% of the radiation illuminating the substrate. As used herein the term "block" or "blocks" means the illumination radiation is reflected off the substrate, absorbed by the substrate or attenuated in any manner to substantially prevent light radiation in the visible and ultraviolet spectra from illuminating the contents of envelope. More desirably, the substrate blocks greater than 75% of the illuminating radiation and most desirably, the substrates blocks greater than 90% of the illuminating visible and ultraviolet radiation. However, the substrate should be substantially transparent to light having a wavelength of about 650 nm to about 1100 nm. One skilled in the art will understand that the substrate may act alone or in combination with other compounds or coatings on the substrate to block the light radiation from illuminating the contents of the envelope. Such combinations are to be considered within the scope of the invention described herein.

The ink used to imprint the coded information is invisible to the unaided eye under both visible and ultraviolet light sources. A preferred ink is described in U.S. Pat. No. 5,614,008 issued to Escano et al. on Mar. 25, 1997 and U.S. Pat. No. 5,423,432 issued to Krutak et al. on Jun. 13, 1995, both commonly assigned to the present assignee. The entire disclosure of each is incorporated herein by reference. Generally, the ink of the present invention contains from about 1 ppm to about 10%, by weight, of a fluorescing compound. Preferably the ink contains from about 1 ppm to about 5%, by weight, and more preferably from about 5 ppm to about 1% by weight of a fluorescing compound. The fluorescing compound present in the ink absorbs the near infrared radiation and produces a fluorescence having a wavelength greater than that absorbed. Preferably, the near infrared fluorophore produces a fluorescence having a wavelength greater than 650 nm, more preferably, greater than 680 nm and most preferably, from about 690 nm to about 900 nm.

The ink can be applied to the substrate using any conventional printer apparatus or method. For example, the fluorescing ink composition can be included in an ink ribbon used in a standard type writer or in a more contemporary liquid ink printing apparatus such as an ink jet printer.

An apparatus useful for excitation and detection of the fluorophoric compound is described in greater detail in the aforementioned U.S. Pat. No. 5,423,432 patent. Generally, such apparatus has a light source capable of emitting radiation in the visible and near infrared regions which excites the fluorophore in the ink. The apparatus also includes a wavelength selector and near IR sensitive photodetector known to those skilled in the art. The output of the photodetector is provided to a level adjustment amplifier, the output of which is provided to an integrated circuit digital multimeter.

Figure 3:
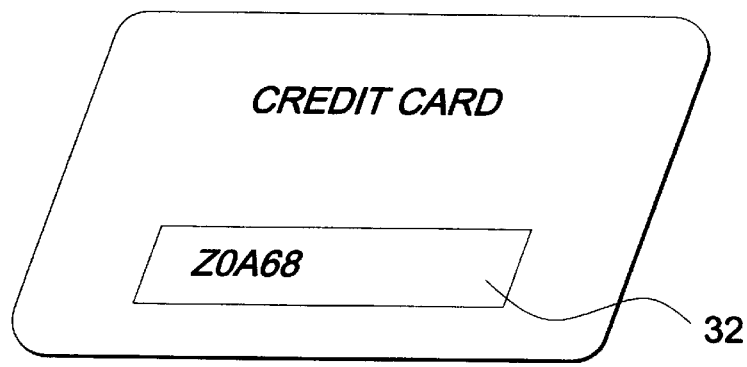

Referring to FIG. 3, another embodiment of the invention is shown as a credit card 30. Conventionally, the card 30 has embossed on one of its surfaces the routine and customary information, such as the issue number, dates of validation, card holder and the like. The card 30 may further include one or more holographic images, not shown, which are generally included on the face of the card 30 to prevent copying and fraud. The credit card 30 can be constructed from a single layer or multiple layers of a polymeric material. The credit card 30 includes an area 32, typically on the back surface, where the holder signs his/her name. The writable surface of the signature area 32 may consist of a coating or an adhesively applied label. The invisible encoded information is positioned in the signature area 32. When only a coating is applied to the signature area 32, the invisible encoded information is preferably printed on the surface of the card 30 before the coating is applied but may also be incorporated into the coating composition. In the case where a label is used, the invisible encoded information is printed on the substrate and covered by the adhesive coating.

Figure 4:
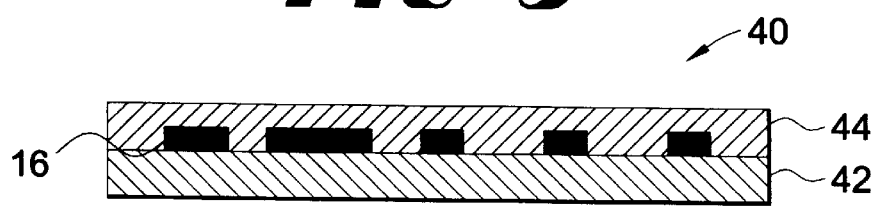
FIG. 4 is a cross-sectional view of another embodiment of the invention wherein the document is comprised of more than one layer and coded information is printed on one layer and covered by a second layer.

Referring to FIG. 4, a cross-sectional view of an alternative embodiment 40 of the invention is illustrated. The invisible compound 16 having the fluorophore is printed on the substrate 42 and then covered by a coating layer 44. The coating layer 44 can be a permanent material such as paint, ink, varnish, lacquer, shellac and the like or a temporary coating such as frost or ice. The coating 44 can have a thickness ranging from about 0.0001 of an inch to about 1 inch. Preferably, the coating has a thickness of about 0.001 of an inch to about 0.375 of an inch. The coating 44 is transparent to the excitation radiation and especially to the wavelength desired to be detected. Advantageously, the fluorescing compounds usefull in the practice of the invention do not require the excitation light to be projected on the surface containing the composition and may instead have one or more layers separating the compound from the excitation light source.

Documents, licenses, credit cards and other articles having invisible security markings of the present invention have an advantage over prior art documents that may have incorporated invisible markings since the compound fluoresces at wavelengths that are substantially transparent to materials that would block visible and ultraviolet radiation. Although not to be bond to any theory, it is believed that the greater ease in which light of the longer wavelengths can penetrate a scattering medium is a result of the wavelength dependence of the scattering phenomenon. Such light scattering is generally referred to as Rayleigh and Mie scattering. As a result, images observed under visible and ultraviolet light are significantly more obscured than images produced by near-infrared light. The prior art methods relied on the principle of contrast where it was desirable to achieve a high reflectance from the substrate and a very low reflectance from the encoded information to assure sensing the encoded information. Thus, where there was insufficient contrast between the substrate and the encoded information, the scanning apparatus did not provide a satisfactory response to read or identify the information. Advantageously, it is no longer necessary to rely on reflectance from the substrate to read the coded information.

Another aspect of the present invention is a method for marking a document with an invisible indicia or encoded information. The method includes the steps of applying an invisible marking to a substrate using a composition containing the fluorophoric compound discussed above, and covering the compound with a layer of material that substantially absorbs or reflects light radiation in the visible and ultraviolet spectra. Advantageously, when documents or other items such as cars, boats, motorcycles, bicycles and the like are marked using a fluorescing compound in accordance with the present invention, the covering layer obscures the marking compound from visible and ultraviolet radiation. The covering layer is substantially transparent to radiation having a wavelength greater than about 680 nm. The encoded information can be detected by exposing the fluorescing compound to the appropriate excitation radiation, generally from about 650 nm to about 1100 nm so that the compound produces a fluorescence. The fluorescence is then detected through the cover layer by using an appropriate detector.

The following Examples are being submitted to further illustrate the present invention and are not intended to limit the scope of the invention described herein.

EXAMPLE 1

An ink formulation having 60 ppm of a fluorophore was prepared in accordance with U.S. Pat. No. 5,614,008, the disclosure of which is incorporated herein by reference. The ink was used to print an invisible bar code on high-gloss filled paper typically used in magazines. The paper was folded so that the invisible code was on a side facing the envelope. Using a modified Accu-Sort model 55 scanner with a 9000 DRX decoder, the bar code was easily detected through the envelope.

EXAMPLE 2

An ink formulation having 100 ppm of a fluorophore was prepared as in Example 1 above. An invisible code was then printed on a substrate and covered by a hot melt rubber based adhesive. The invisible code was detected through the substrate and the adhesive.

EXAMPLE 3

An ink formulation having 100 ppm of a fluorophore was prepared as in Example 1 above. An invisible code was then printed on a substrate and covered by an acrylic emulsion adhesive. The invisible code was detected through the substrate and the adhesive

EXAMPLE 4

Two, one quart high density polyethylene containers were imprinted with an invisible marking. The containers were then filled with dry ice and acetone and placed over a sink containing hot water. The containers were suspended for a sufficient duration to produce a layer of frost on the containers having a thickness of from about ⅛ to about ⅜ of an inch. Using a scanner as described in Example 1 above, the invisible code was decoded through the layer of frost.

One skilled in the art will understand that various modifications can be made to the present invention without departing from the teachings hereof. It is to be further understood that the details, materials and arrangement of the parts of the specific embodiments have been described and illustrated to explain the nature of the invention herein are not intended to limit the claims which define the scope of the invention. Changes may be made by those skilled in the art without departing from spirt and scope of the invention as expressed in the appended claims.

We claim:

1. A composition comprising a substrate and a compound imprinted on a surface of said substrate, said compound when exposed to an excitation radiation produces a fluorescence having a wavelength greater than about 650 nm, and wherein said compound is separated from said excitation radiation by a layer of material that substantially reflects or absorbs visible and ultraviolet radiation.

2. The composition of claim 1 wherein said compound is a fluorescent ink that fluoresces at a wavelength greater than about 680 nm.

3. The composition of claim 1 wherein said layer separating said compound from said excitation radiation is said substrate.

4. The composition of claim 1 wherein said layer separating said compound from said excitation radiation reflects or absorbs greater than 50% of the visible and ultraviolet light.

5. The composition of claim 1 wherein said layer separating said compound from said excitation radiation reflects or absorbs greater than 75% of the visible and ultraviolet light.

6. The composition of claim 1 wherein said layer separating said compound from said excitation radiation reflects or absorbs greater than 90% of the visible and ultraviolet light.

7. The composition of claim 1 wherein said substrate is a metallic surface and said separating layer is a substantially opaque coating covering said fluorescing compound.

8. The composition of claim 7 wherein said coating is selected from the group consisting of paint, ink, lacquer, varnish, ice, frost and shellac.

9. The composition of claim 1 wherein said separating layer comprises a plurality of layers.

10. The composition of claim 1 wherein said substrate is a substantially opaque envelope having said compound placed on an interior portion of said envelope.

11. The composition of claim 1 wherein said substrate is a document having visual text printed thereon and said compound is printed on a label affixed to said document, said label being substantially opaque to UV and visible light.

12. The composition of claim 1 wherein said compound includes invisible indicia printed as a bar code.

13. A security document comprising a substrate having invisible imprinted indicia or encoded information thereon, said invisible imprinted indicia or encoded information comprising a compound that when exposed to an excitation radiation produces a fluorescence having a wavelength greater than about 650 nm, and wherein said compound is separated from said excitation radiation by a layer of material that substantially reflects or absorbs visible and ultraviolet radiation.

14. The document of claim 13 wherein said separation layer is said substrate.

15. The method of claim 14 wherein said compound fluoresces at a wavelength greater that said excitation radiation.

16. A method for marking encoded information on a substrate, said method comprising applying a mark on the substrate using a composition having a fluorophoric compound which fluoresces at a wavelength greater than about 650 nm and covering said marking composition with a layer of material which substantially absorbs or reflects visible and ultraviolet radiation.

17. The method of claim 16 further comprising the steps of exposing the fluorophoric compound to an excitation radiation whereby the compound produces a fluorescence and detecting the fluorescence through said covering layer.

18. The method of claim 16 wherein said substrate is selected from the group consisting of natural materials, synthetic materials and combinations thereof.

19. The method of claim 16 wherein said encoded information is a bar code.

20. The method of claim 16 wherein said covering layer reflects or absorbs greater than 50% of the visible and ultraviolet light.

21. The method of claim 16 wherein said covering layer reflects or absorbes greater than 75% of the visible and ultraviolet light.

22. The method of claim 16 wherein said covering layer reflects or absorbs greater than 90% of the visible and ultraviolet light.

23. The method of claim 16 wherein said fluorescence wavelength is from about 690 nm to about 900 nm.

* * * * *